(Model.)

S. W. D. GREEN.
TETHER.

No. 244,122. Patented July 12, 1881.

Witnesses:
M. M. Lacey
A. Parker.

Inventor
Sampson W. D. Green
By R. S. & A. Lacey
Att'ys

UNITED STATES PATENT OFFICE.

SAMPSON W. D. GREEN, OF MOUNTAIN CREEK, TENNESSEE.

TETHER.

SPECIFICATION forming part of Letters Patent No. 244,122, dated July 12, 1881.

Application filed May 26, 1881. (Model.)

*To all whom it may concern:*

Be it known that I, SAMPSON W. D. GREEN, a citizen of the United States, residing at Mountain Creek, in the county of Warren and State of Tennessee, have invented certain new and useful Improvements in Tethers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in tethers; and it consists in the manner of supporting and tightening or loosening the rope, as will be hereinafter fully described.

Figure 1:
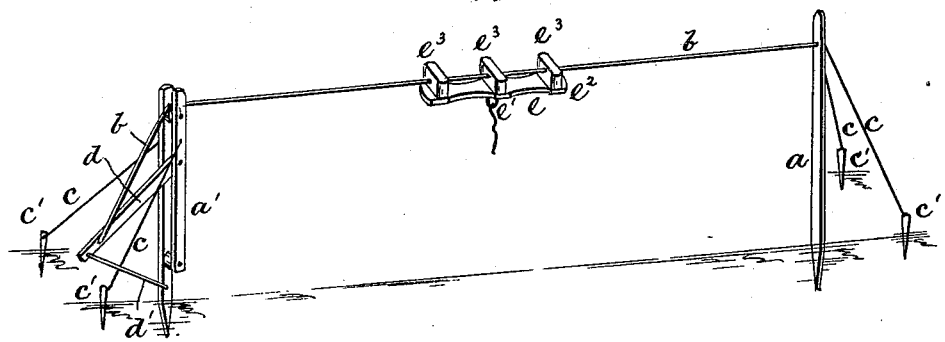
Figure 2:
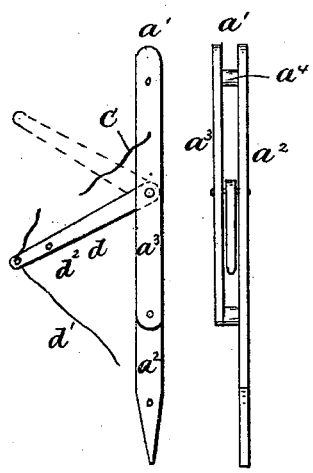
Figure 3:
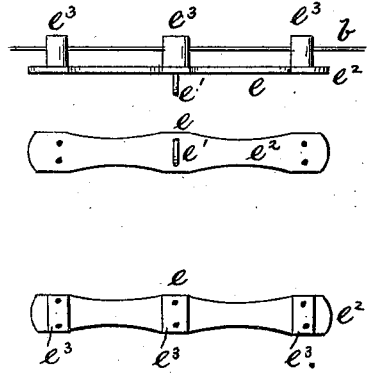

In the drawings, Figure 1 is a perspective, and Figs. 2 and 3 are detail views of my device.

$a\ a'$ are two posts, which have their lower ends sharpened, so they can be driven into the ground, and have their upper ends provided with means for holding the rope $b$.

$c\ c$ are guy-ropes, the ends of which are secured near the upper ends of the posts $a\ a'$ and to pegs $c'\ c'$ driven into the ground. The guys are arranged, as shown, so that they brace firmly against the rope $b$ when the latter is stretched over the posts $a\ a'$. The post $a'$ is by preference made of two parallel bars. The main bar $a^2$ extends below the end of the side bar, $a^3$, and is pointed, as shown, so that it can be driven into the ground. The side bar, $a^3$, is secured to the main bar by any suitable means, so as to provide an intervening space. The upper ends of the two bars are held together by a pin or rod, on which is placed an anti-friction roll, $a^4$, over which the rope $b$ is carried.

Instead of having the post $a$ made of two bars, as described, one bar, $a^2$, could be used, and the bearing roll or pin $a^4$ be attached thereto by a suitable pin, or it could be fixed in a suitable mortise cut through the post.

$d$ is a tension-bar pivoted to the side of the bar $a^2$ of the post $a$, or between the two parallel bars, as shown, and below the bearing-roll $a^4$. It has fastened to its outer end one end of a rope, $d'$, the other end of which is attached to an eye or in a suitable hole near the lower end of the post. By slacking the rope $d'$ the end of the tension-bar may be raised, and tightening the rope draws the end of the tension-bar down.

The tether-rope $b$ has one end made fast to the top of the post $a$, while its other end is carried over the anti-friction-roll $a^4$, and is made fast to the tension-bar $d$ near the outer end of the latter. The end of the rope is put through a hole, $d^2$, and is held from slipping out by a knot formed on its end. If it be desired to shorten the tether-rope, it is necessary only to draw it through the hole $d^2$ until it is shortened to the required length, and then knot it near the tension-arm, and it will be held fast.

The rope $b$ is made taut between the posts $a\ a'$ by drawing down the end of the arm $d$ and securing it by the rope $d'$.

$e$ is the slide placed on the rope $b$, and provided with an eye or ring, $e'$, to which the halter-strap is tied. The slide is composed of a plate, $e^2$, on the upper side of which are formed lugs $e^3$, in which are holes for the passage of the rope $b$.

This tether can be set up easily and quickly, and can be adjusted to any length, and can be made taut or loose, as may be desired.

Having described my invention, what I claim, and desire to secure by Letters Patent, is—

The combination, substantially as hereinbefore set forth, of the posts $a\ a'$, supported by guy-ropes $c\ c$ and pins $c'\ c'$, tension-arm $d$, pivoted to the post $a'$, rope $b$, having one end made fast to the post $a$ and its other end passed over a support, $a^4$, in the post $a'$ and made fast to the tension-bar $d$, and the fastening-rope $d'$, having one end made fast to the end of arm $d$ and its other end free to be tied to any suitable fixture, substantially as set forth.

In testimony whereof I affix my signature in presence of two witnesses.

SAMPSON W. D. GREEN.

Witnesses:
WM. G. CUMMINS,
JOSHUA M. BURGER.